(12) United States Patent
Yachi et al.

(10) Patent No.: US 11,174,331 B2
(45) Date of Patent: Nov. 16, 2021

(54) SHOCK-ABSORBING SHEET

(71) Applicant: SEKISUI CHEMICAL CO., LTD., Osaka (JP)

(72) Inventors: Koji Yachi, Shiraoka (JP); Hiroshi Hiraike, Hasuda (JP); Yuuki Hoshiyama, Shiraoka (JP); Izumi Okamura, Takatsuki (JP); Yasuharu Nagai, Takatsuki (JP); Kazuyuki Yahara, Nagaokakyo (JP); Ayaha Oguri, Takatsuki (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 38 days.

(21) Appl. No.: 16/650,139

(22) PCT Filed: Sep. 28, 2018

(86) PCT No.: PCT/JP2018/036416
§ 371 (c)(1),
(2) Date: Mar. 24, 2020

(87) PCT Pub. No.: WO2019/066020
PCT Pub. Date: Apr. 4, 2019

(65) Prior Publication Data
US 2021/0189032 A1    Jun. 24, 2021

(30) Foreign Application Priority Data
Sep. 28, 2017   (JP) .............. JP2017-187839

(51) Int. Cl.
C08J 9/22      (2006.01)
C08F 20/18     (2006.01)
C08F 220/12    (2006.01)
C08J 9/232     (2006.01)

(52) U.S. Cl.
CPC ............. *C08F 220/12* (2013.01); *C08J 9/232* (2013.01); *C08J 2203/22* (2013.01); *C08J 2333/08* (2013.01)

(58) Field of Classification Search
CPC ........ C08F 220/12; C08F 2/48; C08F 212/08; C08F 220/1804; C08J 9/232; C08J 2203/22; C08J 2333/08; C08J 2201/026; C08J 2333/06; C08J 9/30; C08J 9/32; C08J 2333/00
See application file for complete search history.

(56) References Cited

U.S. PATENT DOCUMENTS

| | | | |
|---|---|---|---|
| 2007/0154662 A1* | 7/2007 | Tanaka | B41M 5/44 428/32.39 |
| 2014/0308457 A1 | 10/2014 | Kim et al. | |
| 2015/0099112 A1 | 4/2015 | Saitou et al. | |

FOREIGN PATENT DOCUMENTS

| | | |
|---|---|---|
| CN | 102321309 A | 1/2012 |
| EP | 2 204 426 | 7/2010 |
| JP | H673870 A | 3/1994 |
| JP | H811882 B2 | 2/1996 |
| JP | H08-108440 A | 4/1996 |
| JP | H10-130412 A | 5/1998 |
| JP | 2002-363330 A | 12/2002 |
| JP | 2004-091675 A | 3/2004 |
| JP | 2008-208341 A | 9/2008 |
| JP | 2010-095722 A | 4/2010 |
| JP | 2011-213967 A | 10/2011 |
| JP | 2012-051984 A | 3/2012 |
| JP | 2013-112768 A | 6/2013 |
| JP | 2013-124279 | 6/2013 |
| JP | 2014-001362 A | 1/2014 |
| JP | 2014001362 A * | 1/2014 |
| JP | 2014-214205 A | 11/2014 |
| JP | 2015-505874 A | 2/2015 |
| JP | 2015-110781 A | 6/2015 |
| JP | 2016-113537 A | 6/2016 |
| JP | 2017-079264 A | 4/2017 |
| JP | 6366776 B1 | 8/2018 |
| WO | WO-2014/098252 A1 | 1/2017 |

OTHER PUBLICATIONS

International Searching Authority, "International Search Report," issued in connection with International Patent Application No. PCT/JP2018/036416, dated Dec. 18, 2018.
International Searching Authority, "Written Opinion," issued in connection with International Patent Application No. PCT/JP2018/036416, dated Dec. 18, 2018.
Notification of Sending Opposition Duplicate dated Jul. 2, 2020 for corresponding Japanese Application No. 2020700388.
Extended European Search Report issued in the corresponding European Application No. 18862728, dated Jun. 9, 2021.
Office Action on TW107134549 dated Aug. 6, 2021 (3 pages).

\* cited by examiner

*Primary Examiner* — Kara B Boyle
(74) *Attorney, Agent, or Firm* — Foley & Lardner LLP

(57) ABSTRACT

A shock-absorbing sheet comprises a foamed resin layer having a thickness of 200 μm or less, a void ratio ($P_{0.1}$) of a plane directional cross section at a thickness of 0.1 T, a void ratio ($P_{0.5}$) of a plane directional cross section at a thickness of 0.5 T, and a void ratio ($P_{0.9}$) of a plane directional cross section at a thickness of 0.9 T from one surface of the foamed resin layer each ranging from 10 to 70 area %; and the standard deviation (Pσ) for an average void ratio found from the void ratio ($P_{0.1}$), the void ratio ($P_{0.5}$) and the void ratio ($P_{0.9}$) ranging from 1.0 to 20.

13 Claims, No Drawings

SHOCK-ABSORBING SHEET

CROSS-REFERENCE TO RELATED APPLICATIONS

The present application claims priority under 37 U.S.C. § 371 to International Patent Application No. PCT/JP2018/036416, filed Sep. 28, 2018, which claims priority to and the benefit of Japanese Patent Application No. 2017-187839, filed on Sep. 28, 2017. The contents of these applications are hereby incorporated by reference in their entireties.

TECHNICAL FIELD

The present invention relates to a shock-absorbing sheet and particularly relates to a thin shock-absorbing sheet.

BACKGROUND ART

A display apparatus to be used for various types of electronic equipment such as personal computers, cellular mobile phones, and electronic paper, is provided with shock-absorbing materials for absorbing impact or vibration between a glass plate and a display section, etc., forming the surface of the apparatus, between a housing body for installation of a display section and the display section etc. Meanwhile, electronic equipment equipped with a display apparatus, and particularly portable electronic devices are required to be thin because of space limitations. Accordingly, shock-absorbing materials are also required to be thin sheet-shaped.

Such thin shock-absorbing materials are broadly known to be formed of foams made of polyolefin resins represented by polyethylene. It is considered that foams made of these polyolefin resins improve the shock absorbing performance, through the control of the flexibility by controlling cells to have a uniform shape (for example, see PTL 1).

CITATION LIST

Patent Literature

PTL1: JP2014-214205 A

SUMMARY OF INVENTION

Technical Problem

However, when shock-absorbing materials are thin foams, the shock absorbing performance thereof cannot be always enhanced sufficiently only through the control of the flexibility by controlling cells to have a uniform shape. For example, glass forming the surface of a display apparatus may be broken when a relatively large impact force of around a few tens of to a few hundred MPa is locally applied. Even if the flexibility of a foam sheet made of a polyolefin resin is controlled, sufficient alleviation of such an impact force is difficult.

The present invention has been achieved in view of the above problems. An object of the present invention is to provide a shock-absorbing sheet having excellent shock absorbing performance even when it is produced to have a small thickness, and particularly being capable of improving the performance of absorbing a relatively large impact force that is applied locally.

Solution to Problem

As a result of intensive studies to achieve the above object, the present inventors have discovered that when the distribution of cells in a foamed resin layer of a shock-absorbing sheet containing the foamed resin layer is uniform, the shock absorbing performance, particularly, the shock absorbing performance of absorbing a relatively large impact force that is applied locally is improved, and thus have completed the present invention.

Specifically, the present invention provides the following (1) to (13).

(1) a shock-absorbing sheet comprising a foamed resin layer having a thickness (T) of 200 μm or less, a void ratio ($P_{0.1}$) of a plane directional cross section at a thickness of 0.1 T, a void ratio ($P_{0.5}$) of a plane directional cross section at a thickness of 0.5 T, and a void ratio ($P_{0.9}$) of a plane directional cross section at a thickness of 0.9 T from one surface of the foamed resin layer each ranging from 10 to 70 area %, and a standard deviation ($P\sigma$) for an average void ratio found from the void ratio ($P_{0.1}$), the void ratio ($P_{0.5}$) and the void ratio ($P_{0.9}$) ranging from 1.0 to 20.

(2) The shock-absorbing sheet according to (1), wherein the foamed resin layer is a foamed acrylic resin layer made of an acrylic resin.

(3) The shock-absorbing sheet according to (2), wherein the acrylic resin constituting the foamed acrylic resin layer has a glass transition temperature ranging from −25° C. to 15° C.

(4) The shock-absorbing sheet according to any one of (1) to (3), wherein a difference between a compressibility upon application of a load of 40 N and a compressibility upon application of a load of 10 N is 15% or more in a compression test for curved surface at 10° C.

(5) The shock-absorbing sheet according to any one of (1) to (4), wherein impact absorptivity at 23° C. is 35% or more.

(6) The shock-absorbing sheet according to any one of (1) to (5), wherein the sheet is used for electronic equipment.

(7) The shock-absorbing sheet according to any one of (1) to (6), wherein the sheet is disposed on the back side of a display apparatus.

(8) The shock-absorbing sheet according to any one of (1) to (7), wherein the void ratio ($P_{0.1}$), the void ratio ($P_{0.5}$) and the void ratio ($P_{0.9}$) each ranges from 10 to 60 area %.

(9) The shock-absorbing sheet according to any one of (1) to (8), wherein the foamed resin layer comprises hollow particles.

(10) The shock-absorbing sheet according to any one of (1) to (8), wherein the foamed resin layer comprises cells of a gas mixed in the foamed resin layer.

(11) A method for producing the shock-absorbing sheet according to (9) above, comprising forming a monomer composition comprising a monomer component for forming a resin and hollow particles into a film and polymerizing the monomer component.

(12) A method for producing the shock-absorbing sheet according to (10) above, comprising mixing a gas into an emulsion composition comprising a resin emulsion and forming the emulsion composition into a film, and then heating the emulsion composition in which the gas is mixed.

(13) The method for producing a shock-absorbing sheet according to (12), comprising mixing a gas into the emulsion composition by a mechanical froth method.

Advantageous Effects of Invention

According to the present invention, a shock-absorbing sheet having excellent shock absorbing performance, such as a shock-absorbing sheet capable of improving the performance of absorbing a relatively large impact force that is applied locally, even if it is thin, can be provided.

DESCRIPTION OF EMBODIMENTS

Hereinafter, the present invention will be described more specifically with reference to embodiments.
[Shock-Absorbing Sheet]

The shock-absorbing sheet of the present invention comprises a foamed resin layer having a thickness (T) of 200 μm or less.

In the foamed resin layer having a thickness (T), the void ratio ($P_{0.1}$) of a plane directional cross section at the thickness of 0.1 T, the void ratio ($P_{0.5}$) of a plane directional cross section at the thickness of 0.5 T, and the void ratio ($P_{0.9}$) of a plane directional cross section at the thickness of 0.9 T from one surface of the foamed resin layer each ranges from 10 to 70 area %. The void ratios each ranging from 10 to 70 area % indicate that a sufficient amount of cells exist in a plane direction, and demonstrate excellent shock absorbing performance in the plane direction.

Further, the foamed resin layer according to the present invention has a standard deviation (Pσ) ranging from 1.0 to 20 for the average void ratio found from the void ratio ($P_{0.1}$), the void ratio ($P_{0.5}$) and the void ratio ($P_{0.9}$). The standard deviation (Pσ) serves as an index for cell distribution in a thickness direction, and the standard deviation ranging from 1.0 to 20 indicates uniform cell distribution in the thickness direction.

Specifically, the void ratio ($P_{0.1}$), the void ratio ($P_{0.5}$) and the void ratio ($P_{0.9}$) within the above range, and, the standard deviation (Pσ) within the above range result in entirely uniform distribution of cells.

Foams of shock-absorbing sheets have heretofore been improved in many ways in terms of the cell diameters and the amounts of cells. However, even if a sufficient amount of cells exist in a plane direction, the entire distribution of cells will not be uniform when the cell distribution in a thickness direction is nonuniform. If the entire distribution of cells is nonuniform, and particularly if cell distribution in a thickness direction is nonuniform, portions containing few cells are unable to sufficiently absorb an impact force applied from the outside. In contrast, according to the present invention, the presence of a sufficient amount of cells in the plane direction, and, the uniform distribution of cells in a thickness direction make it possible to sufficiently absorb an impact applied from the outside. In particular, the shock-absorbing sheet of the present invention comprises cells distributed uniformly, and thus can absorb even a local impact with no problem.

Each of $P_{0.1}$, $P_{0.5}$ and $P_{0.9}$ preferably ranges from 10 to 70 area %, more preferably 15 to 65 area %, and is also preferably 60 area % or less.

Further, Pσ preferably ranges from 1.0 to 20 and more preferably 2.0 to 15.

The above void ratios can be found by the method described later in examples.

The shock-absorbing sheet of the present invention preferably has a tan δ peak height of 0.6 or more and preferably a storage elastic modulus ranging from $1.0 \times 10^5$ to $1.0 \times 10^{10}$ Pa.

Note that in the Description, the terms "tan δ" and "storage elastic modulus" refer to tan δ at 23° C. and storage elastic modulus at 23° C., respectively, unless particularly specified.

The tan δ peak height of 0.6 or more can increase the energy loss, so as to be able to sufficiently improve the shock absorbing performance. In view of further increasing the energy loss, so as to further improve shock absorbing performance, a tan δ peak height is more preferably 0.8 or more and further preferably 1.0 or more. Further, the upper limit of a tan δ peak height is not particularly limited, but is preferably 2.0 or less and more preferably 1.8 or less in order to facilitate the setting of the storage elastic modulus within the above range.

The tan δ peak temperature preferably ranges from 0° C. to 30° C. and more preferably 5° C. to 25° C. in view of improving the shock absorbing performance.

Further, the shock-absorbing sheet has a storage elastic modulus within the above range, so that the shock absorbing performance can be sufficiently improved. The shock-absorbing sheet has a storage elastic modulus ranging from preferably $1.0 \times 10^6$ to $5.0 \times 10^{10}$ Pa in view of further improving the shock absorbing performance.

The shock-absorbing sheet has a density ranging from 0.30 to 0.80 g/cm$^3$, for example, preferably 0.40 to 0.80 g/cm$^3$, more preferably 0.50 to 0.80 g/cm$^3$, and further preferably 0.60 to 0.80 g/cm$^3$. The shock-absorbing sheet has a density within the above range, so that the shock-absorbing sheet can sufficiently absorb an impact applied to the shock-absorbing sheet, and the occurrence of namely bottoming in which impact is propagated to members on the back can be prevented. Further preferably, the shock-absorbing sheet has a density ranging from 0.63 to 0.77 g/cm$^3$ and further more preferably 0.66 to 0.74 g/cm$^3$ in view of further improving the shock absorbing performance.

The shock-absorbing sheet has a thickness of 200 μm or less, preferably ranging from 20 μm to 180 μm, and more preferably 50 μm to 150 μm. The thickness of 200 μm or less makes it possible to contribute to thinning and miniaturization of electronic equipment. Further preferably, the shock-absorbing sheet has a thickness of 20 μm or more, so as to prevent namely bottoming from taking place when an impact is applied to the shock-absorbing sheet.

The resin foam layer may be a resin foam layer comprising closed cells or open cells, or a resin foam layer comprising both closed cells and open cells, and is preferably a resin foam layer comprising mainly closed cells. Specifically, the closed cell ratio in the shock-absorbing sheet preferably ranges from 60% to 100%, more preferably 70% to 100%, and further preferably 80% to 100%.

Note that the closed cell ratio can be found in accordance with JIS K7138 (2006). Further, the shock-absorbing sheet of the present invention may be the one having a relatively high density as described above, and such foams are fine foams because of the low expansion ratio.

The foamed resin layer is preferably a foamed acrylic resin layer wherein the resin comprises an acrylic resin. Such a foamed acrylic resin layer composed of an acrylic resin can realize the tan δ peak height and the storage elastic modulus within the above adequate ranges, so as to be able to sufficiently absorb an impact applied from the outside.

An acrylic resin constituting the foamed acrylic resin layer has preferably a glass transition temperature ranging from −25° C. to 15° C., and more preferably −20° C. to 10° C. With a glass transition temperature ranging from −25° C. to 15° C., the foamed acrylic resin layer can be sufficiently deformed when an impact is applied from the outside and can impart a not excessively soft property, so as to be able to exhibit high shock-absorbing property.

Note that the glass transition temperature of an acrylic resin can be found by a method described later in examples.

The shock-absorbing sheet is preferably a cross-linked product. When the shock-absorbing sheet is a cross-linked product, a gel fraction indicating the degree of crosslinking of the shock-absorbing sheet is preferably 60 mass % or more, more preferably 75 mass % or more, further preferably 80 mass % or more, and particularly preferably 90 mass % or more. Further, the shock-absorbing sheet may not be a cross-linked product. If the shock-absorbing sheet is not a cross-linked product, its gel fraction is increased when the molecular weight of the resin component is high. Moreover, when the shock-absorbing sheet is not a cross-linked product, its gel fraction is preferably within the above range.

Note that a gel fraction is measured by the following method.

A test piece (mass A (mg) of the test piece) is cut out from the shock-absorbing sheet in such a manner that the mass is about 50 mg. The test piece is immersed in 30 cm$^3$ of tetrahydrofuran at 23° C. and then left to stand for 24 hours. Subsequently, the resultant is filtered through a 200-mesh wire net to collect an insoluble on the wire net, the insoluble is vacuum-dried, and then the mass B (mg) of the insoluble is precisely weighed. The gel fraction is calculated from the thus obtained value by the following equation.

Degree of crosslinking (mass %)=($B/A$)×100

Further, in the shock-absorbing sheet of the present invention, a difference between the compressibility upon application of a load of 40 N and the compressibility upon application of a load of 10 N is preferably 15% or more, and more preferably 16% or more in a compression test for curved surface at 10° C. Note that compressibility as measured at 10° C. in a compression test for curved surface is found by using a known universal testing machine, compressing the shock-absorbing sheet using a brass plate having a thickness of 5 mm and a hemispherical upper terminal made of SUS with a diameter of 15 mm at a compression velocity of 1 mm/min, and then measuring compressibility when a predetermined load is thus applied. The measurement method is as specifically described later in examples. A difference of 15% or more between the compressibility upon application of a load of 40 N and the compressibility upon application of a load of 10 N in a compression test for curved surface at 10° C. makes it possible to sufficiently absorb a relatively large impact force that is locally applied.

The compressibility upon application of a load of 10 N in a compression test for curved surface at 10° C. is preferably 15% or more and 50% or less, and is more preferably 20% or more and 45% or less. Further, the compressibility upon application of a load of 40 N in a compression test for curved surface at 10° C. is preferably 30% or more and 70% or less and is more preferably 35% or more and 65% or less. The compressibility upon application of a load of 10 N and the compressibility upon application of a load of 40 N, which are within the above ranges, enable sufficient absorption of an impact applied from the outside without allowing the occurrence of namely bottoming.

Further, the shock-absorbing sheet of the present invention preferably exhibits impact absorptivity at 23° C. of 35% or more, more preferably 40% or more, and further preferably 45% or more. Note that impact absorptivity is measured by a method described later in examples. The impact absorptivity of 35% or more makes it possible to enhance shock-absorbing property against a local impact, and thus for example, a display defect on the flexible display can be easily prevented.

In the shock-absorbing sheet of the present invention, the foamed resin layer preferably comprises hollow particles. Specifically, voids (cells) are preferably formed due to the presence of hollow particles. The foamed resin layer comprises hollow particles, so that the shape of the resulting cell can be adjusted to a spherical shape. Further, the initial shock-absorbing property can be enhanced.

Further, cells in the shock-absorbing sheet of the present invention may be formed independently from hollow particles, and is also preferably formed of a gas that is mixed into a resin composition constituting the foamed resin layer. A gas is mixed in to form cells, so that the shape of resulting cells is difficult to break even when impacts are repeatedly applied. Accordingly, the shock absorbing performance is excellent.

In the Description, a shock-absorbing sheet wherein a foamed resin layer comprises hollow particles is described as the shock-absorbing sheet of a first embodiment. Further, a shock-absorbing sheet wherein a foamed resin layer containing cells formed of a gas mixed in a resin composition is described as the shock-absorbing sheet of a second embodiment.

Note that common features of the foamed resin layers of the first and the second embodiments are as described above in the description of the shock-absorbing sheet, and the first and the second embodiments will be described separately as follows.

First Embodiment

The shock-absorbing sheet of the first embodiment is a shock-absorbing sheet wherein the foamed resin layer comprises hollow particles. Hollow particles to be used in the first embodiment are not particularly limited, and may be hollow inorganic microspheres, hollow organic microspheres, or hollow organic/inorganic composite microspheres. Examples of hollow inorganic microspheres include hollow balloons made of glass such as hollow glass balloons, hollow balloons made of metal compounds such as hollow balloons made of silica and hollow alumina balloons, and porcelain hollow balloons such as hollow ceramic balloons. Further, examples of hollow organic microspheres include hollow acryl balloons, hollow vinylidene chloride balloons, phenol balloons, and hollow balloons made of a resin such as epoxy balloons.

The mean particle diameter of hollow particles is not particularly limited, as long as it is equal to or less than the thickness of the foamed resin layer, and preferably ranges from 10 μm to 150 μm, more preferably 20 μm to 130 μm, and further preferably 30 μm to 100 μm. With hollow particles having a mean particle diameter ranging from 10 μm to 150 μm, sufficient shock-absorbing property can be obtained.

The mean particle diameter of hollow particles can be measured by a laser diffraction method or a low-angle laser light scattering method, for example.

The ratio of the mean particle diameter of hollow particles to the thickness of the foamed resin layer (mean particle diameter/thickness) preferably ranges from 0.1 to 0.9, and preferably 0.2 to 0.85. The ratio of mean particle diameter/thickness within the above range and the following viscosity within the following range can prevent partial floating of hollow particles upon formation of the foamed resin layer and final nonuniform distribution of void ratios.

The density of hollow particles is not particularly limited, but preferably ranges from 0.01 g/cm$^3$ to 0.4 g/cm$^3$, and more preferably 0.02 g/cm$^3$ to 0.3 g/cm$^3$. The density of hollow particles ranging from 0.01 g/cm$^3$ to 0.4 g/cm$^3$ can prevent floating and enables uniform particle dispersion upon formation of the foamed resin layer, for example.

The foamed resin layer of the first embodiment preferably comprises a foamed acrylic resin layer as described above. The foamed acrylic resin layer is formed by a method described later using a monomer composition containing an acrylic monomer component constituting an acrylic resin, hollow particles, a cross-linking agent, and a photopolymerization initiator and the like, for example. Here, examples of an acrylic monomer component include a polar group-containing monomer and an alkyl (meth)acrylate. The content of a polar group-containing monomer in such an acrylic monomer component is preferably 10 mass % or more, and more preferably ranges from 10 mass % to 35 mass %. With the content of a polar group-containing monomer of 10 mass % or more, the shock-absorbing property of the thus formed shock-absorbing sheet can be further improved by interaction between polar groups.

Examples of a polar group-containing monomer include a carboxyl group-containing monomer or an anhydride thereof, a hydroxyl group-containing (meth)acrylic monomer, and a primary or secondary amino group-containing (meth)acrylic monomer.

Examples of a carboxyl group-containing monomer can include vinyl group-containing carboxylic acids such as (meth)acrylic acid, crotonic acid, cinnamic acid, itaconic acid, maleic acid, fumaric acid, and citraconic acid.

Examples of a hydroxyl group-containing (meth)acrylic monomer can include vinyl monomers having hydroxyl groups such as 2-hydroxyethyl (meth)acrylate, 2-hydroxypropyl (meth) acrylate, 4-hydroxybutyl (meth)acrylate, caprolactone-modified(meth)acrylate, polyoxyethylene (meth)acrylate, and polyoxypropylene(meth)acrylate.

Examples of a primary or secondary amino group-containing (meth)acrylic monomer include amino group-containing (meth)acrylic monomers such as aminoethyl (meth) acrylate and t-butylaminoethyl (meth) acrylate.

Of these examples, a carboxyl group-containing monomer is preferable, (meth)acrylic acid is more preferable, and acrylic acid is further preferable.

These polar group-containing monomers may be used singly or in combinations of two or more thereof.

Examples of alkyl (meth)acrylate include alkyl (meth) acrylate monomers having linear or branched alkyl groups. Examples of such an alkyl (meth)acrylate monomer include alkyl (meth)acrylates having C1-4 alkyl groups such as methyl (meth)acrylate, ethyl (meth)acrylate, n-propyl (meth)acrylate, isopropyl (meth)acrylate, n-butyl (meth) acrylate, isobutyl (meth)acrylate, sec-butyl (meth)acrylate, and t-butyl (meth)acrylate. Particularly, ethyl (meth)acrylate, n-butyl (meth)acrylate, isobutyl (meth)acrylate, sec-butyl (meth)acrylate, and t-butyl (meth)acrylate are preferable.

In addition, these alkyl (meth)acrylates can be used singly or in combinations of two or more thereof.

The total amount of the polar group-containing monomer and the alkyl (meth)acrylate is preferably 85 mass % or more, and more preferably 90 mass % or more in a monomer composition.

Further, hollow particles are as described above and the content thereof in a monomer composition preferably ranges from 0.5 to 5 parts by mass and more preferably 1 to 3 parts by mass with respect to 100 parts by mass of an acrylic monomer component. With the content of hollow particles ranging from 0.5 to 5 parts by mass, the thus produced shock-absorbing sheet can have the previously specified void ratios.

Further, examples of a cross-linking agent include an agent having two or more vinyl groups and preferably polyfunctional (meth)acrylate having two or more (meth) acryloyl groups. Such a cross-linking agent is incorporated into main chains for crosslinking the main chains, thereby forming a network.

Specific examples of a cross-linking agent include hexanediol di(meth)acrylate, polyethyleneglycol di(meth) acrylate, polypropyleneglycol di(meth)acrylate, ethoxylated bisphenol A di(meth)acrylate, tris(2-hydroxyethyl)isocyanurate triacrylate, ε-caprolactone-modified tris(2-acryloxy ethyl)isocyanurate, caprolactone-modified ethoxylated isocyanuric acid triacrylate, ethoxylated trimethylol propane triacrylate, proxylated trimethylol propane triacrylate, proxylated glyceryl triacrylate, neopentyl glycol adipate diacrylate, polyurethane acrylate, epoxy acrylate, polyester acrylate, and liquid hydrogenated 1,2-polybutadiene diacrylate.

The amount of a cross-linking agent to be used herein is not particularly limited and preferably ranges from 0.1 to 7 parts by mass and more preferably 0.2 to 5 parts by mass with respect to 100 parts by mass of an acrylic monomer component.

Examples of a photopolymerization initiator include, but are not particularly limited to, a ketal-based photopolymerization initiator, an α-hydroxy ketone-based photopolymerization initiator, an α-aminoketone-based photopolymerization initiator, an acylphosphine oxide-based photopolymerization initiator, a benzoin ether-based photopolymerization initiator, an acetophenone-based photopolymerization initiator, an alkylphenone-based photopolymerization initiator, an aromatic sulfonyl chloride-based photopolymerization initiator, a photoactive oxime-based photopolymerization initiator, a benzoin-based photopolymerization initiator, a benzil-based photopolymerization initiator, a benzophenone-based photopolymerization initiator, and a thioxanthone-based photopolymerization initiator. In addition, these polymerization initiators can be used singly or in combinations of two or more thereof.

The amount of such a photopolymerization initiator to be used is not particularly limited, and preferably ranges from 0.05 to 3 parts by mass and more preferably 0.1 to 1.5 parts by mass with respect to 100 parts by mass of an acrylic monomer component.

The monomer composition may contain other additives such as a metal harm inhibitor, an antistatic agent, a stabilizer, a nucleant, a cross-linking agent, a cross-linking auxiliary, a pigment, a halogen flame retardant and a phosphorus flame retardant etc., and a filler, as long as they do not inhibit the purpose of the present invention.

(Method for Producing Shock-Absorbing Sheet of First Embodiment)

The shock-absorbing sheet of the first embodiment can be produced by forming a monomer composition comprising at least a monomer component for forming various resins and hollow particles into a film, and thus at least polymerizing the monomer component. Note that a monomer component contained in a monomer composition may be partially polymerized, so that the monomer component has desired viscosity as described later.

Hereinafter, the method for producing a shock-absorbing sheet of the first embodiment is more specifically described with reference to a case in which the foamed resin layer is an acrylic resin foamed layer, as an example.

A method for forming a foamed acrylic resin layer is not particularly limited. A foamed acrylic resin layer is formed by, for example, coating an appropriate support such as a release film or a base material with a monomer composition comprising the above-mentioned acrylic monomer component, hollow particles, cross-linking agent, photopolymerization initiator, and the like, so as to form a coating layer, and then curing the layer with active energy rays. Hence, a shock-absorbing sheet comprising the foamed acrylic resin layer, or a shock-absorbing sheet comprising the foamed acrylic resin layer on the base material is obtained.

Note that a release film (separator) or the like to be used upon formation of the foamed acrylic resin layer may be separated at an adequate time, or may be separated upon the use of the thus prepared shock-absorbing sheet.

Here, an acrylic monomer component to be contained in a monomer composition is preferably subjected in advance to partial polymerization. The acrylic monomer component generally has very low viscosity. Accordingly, a monomer composition subjected in advance to partial polymerization (polymerization of a portion(s)) as described below is used, so that the shock-absorbing sheet of the present invention can be produced more efficiently.

Here, such a monomer composition obtained by the above-mentioned partial polymerization can be prepared as described below, for example. First, a monomer composition excluding hollow particles and a cross-linking agent is subjected to partial polymerization using active energy rays, thereby preparing a so-called syrup curable acrylic resin material. The viscosity (viscosity measured using a type B Viscometer under conditions of a measurement temperature of 23° C. and 100 rpm) at this time is preferably adjusted to range from 200 to 5000 mPa·s, and more preferably adjusted to range from 300 to 4000 mPa·s. The viscosity adjusted to range from 200 to 5000 mPa·s makes it possible to prevent hollow particles from floating and to realize the uniform void ratios in a thickness direction.

Subsequently, the curable acrylic resin material, hollow particles, a cross-linking agent and the like are mixed and stirred, so that a monomer composition in which hollow particles are dispersed in the curable acrylic resin material can be prepared.

Note that a coating method to be employed upon coating is not particularly limited, and a general method can be employed. Examples of such a coating method include a slot die method, a reverse gravure coating method, a microgravure method, a dip method, a spin coating method, a brush coating method, a roll coating method and a flexo printing method.

Further, examples of active energy rays include ionizing radiation such as α rays, β rays, γ rays, neutron rays, and electron rays, and ultraviolet rays. In particular, ultraviolet rays are suitably used. The irradiation energy, the irradiation time and the like of active energy rays are not particularly limited, as long as they do not inhibit the reaction of monomer components.

Second Embodiment

Next, the shock-absorbing sheet of the second embodiment of the present invention is as described below. The shock-absorbing sheet of the second embodiment is a foam comprising cells of a gas mixed in the foamed resin layer.

Cells in this embodiment are not formed of voids within hollow particles, but are formed of voids that are directly formed in a resin composition constituting the foamed resin layer, wherein the inner surface of cells is made of a resin composition. Specifically, the cells of the foamed resin layer are cells in which the inner wall does not have any shell structure. The cells in which the inner wall does not have any shell structure can have a shape difficult to break since the inner wall is not easily damaged by an impact, so that the shock absorbing performance can be improved even when impacts are repeatedly applied to the shock-absorbing sheet.

In addition, a gas mixed in the foamed resin layer may be a gas generated from a foaming agent or the like blended in a resin composition constituting the foamed resin layer, and is preferably a gas that is mixed in from the outside of a resin composition by a mechanical froth method or the like described later.

The shock-absorbing sheet of the second embodiment is not particularly limited, as long as the average cell diameter equals to or is lower than the thickness of the foamed resin layer, and the average cell diameter preferably ranges from 10 μm to 150 μm, and more preferably 20 μm to 130 μm. With the average cell diameter within the above range, sufficient shock-absorbing property can be obtained. Note that the average cell diameter of cells can be measured using an X-ray CT apparatus as described later.

In the second embodiment, the ratio of the average cell diameter to the thickness of the foamed resin layer (average cell diameter/thickness) preferably ranges from 0.1 to 0.9 and more preferably 0.2 to 0.85. The average cell diameter/thickness ratio within the range, and, as described later, the viscosity of an emulsion composition after mixing in of a gas, which is within a predetermined range, can prevent cells from floating partially upon formation of the foamed resin layer, and final distribution of void ratios from becoming nonuniform.

The foamed resin layer of the second embodiment may be produced using a resin emulsion as a raw material. Examples of a resin emulsion include water dispersions of various resins. The foamed resin layer of the second embodiment preferably comprises a foamed acrylic resin layer as described above and the resin emulsion is preferably an acrylic emulsion.

The acrylic emulsion is a water dispersion of an acrylic resin and a known example thereof can be used. The acrylic emulsion can be obtained by emulsion polymerization, suspension polymerization, dispersion polymerization or the like of acrylic monomer components in the presence of a polymerization initiator, an emulsifier, a dispersion stabilizer or the like, which is blended as necessary.

The foamed resin layer of the second embodiment is produced using an emulsion composition as a raw material, which contains an emulsion such as an acrylic emulsion, and further contains additives, which are blended as necessary, including a cell stabilizer comprising a surfactant and the like, a thickener, a cross-linking agent and a pigment by a method described later.

Further, the emulsion composition contains water as a dispersion medium. Moreover, the emulsion composition may contain, in addition to water, a polar solvent such as methyl alcohol, ethyl alcohol, and isopropyl alcohol.

The solid content of the emulsion composition preferably ranges from 30 mass % to 70 mass %, and more preferably 35 mass % to 60 mass %. The solid content within the range facilitates the adjustment of the viscosity of the emulsion composition in which cells are formed as described later within a desired range.

The acrylic monomer component in this embodiment contains alkyl (meth)acrylate. Further, examples of the alkyl (meth)acrylate include alkyl (meth)acrylate having a C1-18 alkyl group, and preferably alkyl (meth)acrylate having a C1-12 alkyl group, and more preferably alkyl (meth)acrylate having a C1-8 alkyl group.

Specific examples of the alkyl (meth)acrylate having a C1-8 alkyl group include, in addition to those illustrated as the alkyl (meth)acrylate having a C1-4 alkyl group, n-pentyl (meth) acrylate, n-hexyl (meth) acrylate, n-heptyl (meth) acrylate, n-octyl (meth)acrylate, and 2-ethylhexyl (meth) acrylate.

The acrylic monomer component in this embodiment preferably contains, in addition to alkyl (meth)acrylate, a styrene monomer. The acrylic monomer component containing a styrene monomer facilitates the improvement in the impact resistant absorbability of the shock-absorbing sheet. Examples of the styrene monomer include styrene, various methylstyrenes such as α-methylstyrene, β-methylstyrene, and 4-methylstyrene, and various ethylstyrenes. Of these, styrene is preferable.

Further, the acrylic monomer component may contain a polymerizable monomer other than alkyl (meth)acrylate and a styrene monomer, and may contain the above polar group-containing monomer and the like, for example.

The content of alkyl (meth)acrylate in the acrylic monomer component in this embodiment preferably ranges from 30 mass % to 90 mass % and more preferably 40 mass % to 80 mass %.

Further the content of a styrene monomer in the acrylic monomer component preferably ranges from 10 mass % to 70 mass % and more preferably 20 mass % to 60 mass %.

(Method for Producing Shock-Absorbing Sheet of Second Embodiment)

Hereinafter, a method for producing the shock-absorbing sheet of the second embodiment is as described below. The shock-absorbing sheet of the embodiment can be produced by mixing a gas into the above emulsion composition, forming it into a film, heating and drying the emulsion composition containing the gas mixed therein, and then heating as necessary for crosslinking, for example.

Here, preferably a gas is mixed into an emulsion composition by a mechanical froth method. Specifically, an emulsion composition is kneaded using a kneading machine with a high-speed shearing mode, a vibration mode, or the like while injecting a gas, thereby obtaining an emulsion composition in which cells are formed. Air, nitrogen, carbon dioxide, argon or the like can be used as a gas. Further, an apparatus with a compressed gas discharging mode may be used, for example. Meanwhile, the amount of a gas to be mixed in is preferably adjusted adequately so that the thus obtained foam has the above-mentioned density.

The emulsion composition containing cells formed therein is then applied onto an appropriate support such as a release film or a base material, so as to form a coating layer, the layer is heated and dried, and then crosslinking is performed by the above heating as necessary, thereby obtaining a shock-absorbing sheet comprising a foam.

Here, the temperature for heating is not particularly limited and preferably ranges from 30° C. to 150° C. and more preferably 50° C. to 130° C.

In the embodiment, the viscosity of the emulsion composition containing cells formed therein is preferably adjusted to range from 200 mPa·s to 5000 mPa·s, and more preferably adjusted to range from 300 mPa·s to 4000 mPa·s. Adjustment of the viscosity within the above range can prevent cells mixed therein from floating and can equalize the void ratios in a thickness direction. The viscosity of the emulsion composition can be adjusted using the amount of a gas to be mixed in, kneading time, a cell stabilizer including a surfactant etc., a thickener, and the like. For example, the use of a thickener facilitates to control the viscosity within the above range.

Further, the size of cells in the emulsion composition is substantially similar to the size of cells of the shock-absorbing sheet. Accordingly, the size of cells in the emulsion composition is preferably adjusted in such a manner that the average cell diameter and the ratio of average cell diameter/thickness are within the above desired ranges. Adjusting the average cell diameter and the ratio of average cell diameter/thickness within the above ranges, in addition to viscosity, facilitates to ensure the uniformity of the void ratios in a thickness direction. Note that the average cell diameter of the emulsion composition can be adjusted through adjustment of the kneading time and the like.

[Method for Using Shock-Absorbing Sheet]

Hereinafter, methods for using the shock-absorbing sheet of the present invention described above are described.

The shock-absorbing sheet of the present invention can be used for various types of electronic equipment, and preferably portable electronic devices such as note-type personal computers, cellular mobile phones, electronic paper, digital cameras, and video cameras, for example. More specifically, the shock-absorbing sheet is used as a shock-absorbing sheet for display apparatuses to be installed in these examples of electronic equipment. Examples of display apparatuses include organic EL display apparatuses and liquid crystal display apparatuses, and preferably organic EL display apparatuses.

Further, a display apparatus and particularly an organic EL display apparatus are preferably produced as a flexible display. An organic EL display apparatus can be produced as a flexible display by forming an organic EL element equipped with both electrodes, a luminescent layer formed between the electrodes, and a sealing material for sealing the luminescent layer on a film substrate.

When the shock-absorbing sheet is used for display apparatuses, the shock-absorbing sheet is disposed on the back side of various display apparatuses, so as to absorb impacts applied to the display apparatuses. More specifically, the shock-absorbing sheet is placed on a case of electronic equipment, for example, so that it is disposed between the case and the display apparatus. Further, the shock-absorbing sheet is generally compressed and disposed between parts constituting electronic equipment, such as a case, and the display apparatus.

The shock-absorbing sheet of the present invention possesses high shock absorbing performance even if it is thin, so as to be able to appropriately prevent the display apparatus from being damaged while thinning the electronic equipment. Further, the shock-absorbing sheet makes it possible to appropriately absorb an impact even if it is a relatively large impact applied locally, and thus makes it possible to appropriately prevent a display defect etc., from taking place on the flexible display.

Further, resin sheets may be laminated onto one of or both surfaces of the above-described shock-absorbing sheet of the present invention, as necessary, and then the sheets may be used. Examples of resins to be used for the resin sheets include polyolefin resins such as polyethylene and polypropylene, and thermoplastic resins such as a polyethylene terephthalate resin. Each resin sheet is preferably thinner than the shock-absorbing sheet, and has a thickness ranging from 10 μm to 300 μm, and preferably ranging from 10 μm to 200 μm, for example. Resin sheets may be adhered to the shock-absorbing sheet by thermocompression, or using an adhesive or the like.

Further, an adhesive material may be provided on one of or both surfaces of the shock-absorbing sheet and then the sheet may be used as an adhesive tape. The shock-absorbing sheet is produced as an adhesive tape, making it possible to adhere to a part such as a case of electronic equipment via the adhesive material.

The adhesive material may be an adhesive material equipped with at least an adhesive layer, an adhesive material made of a single adhesive layer laminated onto the surface of the shock-absorbing sheet, or a double-faced adhesive sheet stuck on the surface of the shock-absorbing sheet, and is preferably a single adhesive layer. Note that the double-faced adhesive sheet is equipped with a base material and an adhesive layer provided on both surfaces of the base material. The double-faced adhesive sheet is used to adhere one adhesive layer to the shock-absorbing sheet and to adhere the other adhesive layer to another part.

Examples of an adhesive constituting an adhesive layer, which can be used herein, include, but are not particularly limited to, an acrylic adhesive, a urethane adhesive, and a rubber adhesive. The thickness of an adhesive material preferably ranges from 5 µm to 200 µm and more preferably 7 µm to 150 µm. Further, onto the adhesive material, a release sheet such as release paper is further stuck. In such a manner, an adhesive layer may be protected with release paper before use.

EXAMPLES

The present invention is described more specifically with reference to examples, but the present invention is not limited by these examples.
[Evaluation Method]
In the present invention, each physical property and performance of the shock-absorbing sheets were evaluated by the following methods.
<Void Ratio and Standard Deviation>
A shock-absorbing sheet was stuck on a 50-µm-thick PET film, cut out in a size of 3 mm wide×15 mm long, and then subjected to three-dimensional measurement using a X-ray CT apparatus. Note that the X-ray CT apparatus is not particularly limited and TDM1000H-II(2K) (Yamato Scientific Co., Ltd.) was used in the examples. Resolution is about 1.5 µm/1 pixel.

Next, the boundary surface between the PET film and the shock-absorbing sheet was designated as a reference surface, and then the total number $S_T$ of sectional images existing in a direction perpendicular to the reference surface (thickness direction) was counted. In addition, sectional images existing in the thickness direction were determined to range from the image of the boundary surface (reference surface) between the PET film and the shock-absorbing sheet to the last image of the shock-absorbing sheet on the opposite surface.

Subsequently, the $0.1S_T$th sectional image was binarized using image processing software "Avizo9.2.0" (FEI (Thermo Fisher Scientific.)), and then separated into a void portion and a resin portion. Finally, the proportion of the area of the void portion relative to the whole area of the image was calculated, thereby finding the void ratio ($P_{0.1}$) of a plane directional cross section at the thickness of 0.1 T. Note that when $0.1S_T$ was not an integer, the first decimal place was rounded off.

The void ratio ($P_{0.5}$) of a plane directional cross section at the thickness of 0.5 T and the void ratio ($P_{0.9}$) of a plane directional cross section at the thickness of 0.9 T were each found in a similar manner.

Further, the average void ratio was found from the calculated void ratio ($P_{0.1}$), void ratio ($P_{0.5}$) and void ratio ($P_{0.9}$), and then the standard deviation (PG) therefor was found.

<Average Cell Diameter>
Sectional images of surfaces parallel to the thickness direction and MD direction were retrieved using the above X-ray CT apparatus, all cells existing in a 1.5 mm long section in the MD direction were measured. This operation was repeated 5 times, the average value of the diameters of all the cells in the thickness direction was designated as the average cell diameter. Note that in the examples, the MD direction refers to the coating direction.
<Glass Transition Temperature: Tg>
Glass transition temperatures were found using the FOX equation represented by the following equation (1) (T. G. Fox, Bull. Am. Physics Soc., Vol. 1, No. 3, page 123(1956)).

$$1/T = Xa/Ta + Xb/Tb + Xc/Tc + \ldots \qquad \text{Equation (1):}$$

In Equation (1) above, T is the glass transition temperature (absolute temperature K) of a polymer, Xa is the proportion (weight ratio) of polymerizable monomer component "a" constituting the polymer, Ta is the glass transition temperature (absolute temperature K) of a polymer (homopolymer) consisting only of component "a". Hereinafter, the same applies to component "b", component "c", and so on, and all polymerizable monomers constituting the polymer are used for calculation.

In addition, the glass transition temperatures of homopolymers have been found as in "Polymer Handbook", J. Brandrup and E. H. Immergut and edited by Interscience Publishers, for example.
<tan δ and Storage Elastic Modulus>
With the use of a measurement apparatus, DVA-200 (I T Keisoku Seigyo, Co. Ltd.), tan δ and storage elastic modulus at 23° C. were found under conditions of tensile mode of 10 Hz, deformation of 0.1%, temperature range between −100° C. and 100° C., and temperature increase rate of 10° C./min. The size of a sample is 40 mm long (here, the gripping distance was 25 mm) and 5 mm wide. Further, tan δ peak temperature and peak height were also found.
<Thickness>
A value measured using a dial gauge was designated as thickness.
<Apparent Density>
The density of a shock-absorbing sheet is the value of apparent density measured in accordance with JIS K6767.
<Gel Fraction (Degree of Crosslinking)>
A test piece (mass A (mg) of the test piece) was cut out from a shock-absorbing sheet in such a manner that the mass was about 50 mg. The test piece was immersed in 30 cm³ of tetrahydrofuran at 23° C., left to stand for 24 hours, and then filtered through a 200-mesh wire net to collect an insoluble on the wire net. The insoluble was vacuum-dried, and then the mass B (mg) of the insoluble was precisely weighed. The degree of crosslinking was calculated from the thus obtained value by the following equation.

Degree of crosslinking (mass %) = $(B/A) \times 100$

<Compression Test for Curved Surface>
In a universal testing machine (A & D Company, "TENSILON"), a hemispherical terminal made of SUS with a diameter of 15 mm was fixed on the top compression plate using a 30-µm double-sided tape (Sekisui Chemical Co., Ltd., "3803H"). Further, a 67 mm square and 5 mm thick brass plate was fixed onto the bottom compression plate using a double-sided tape similar to the above double-sided tape.

Subsequently, a shock-absorbing sheet was placed on the center of the brass plate, and then a compression test for curved surface was conducted under a test environment of 10° C. and compression velocity of 1 mm/min. Data analysis was conducted using a time point at which a load of 0.04 N was applied as the compression start point for compression of the shock-absorbing sheet. The deformation ($S_{10\text{-}1}$) of the shock-absorbing sheet when a load of 10 N was applied and the deformation ($S_{40\text{-}1}$) of the shock-absorbing sheet when a load of 40 N was applied were measured. Next, the deformation ($S_{10\text{-}1}$) and the deformation ($S_{40\text{-}1}$) were divided by the thickness (T) of the shock-absorbing sheet as in the following equations, thereby finding compressibility upon application of a load of 10 N ($R_{10\text{-}1}$) and compressibility upon application of a load of 40 N ($R_{40\text{-}1}$).

$$R_{10\text{-}1}(\%)=S_{10\text{-}1}/T\times100$$

$$R_{40\text{-}1}(\%)=S_{40\text{-}1}/T\times100$$

Further, different shock-absorbing sheets before the compression test for curved surface were used to repeatedly conduct a similar test and data analysis twice. The average value of a total 3 times of the test and analysis was determined to be compressibility upon application of a load of 10 N ($R_{10}$) and compressibility upon application of a load of 40 N ($R_{40}$). Further, as in the following equation, the compressibility upon application of a load of 10 N ($R_{10}$) was subtracted from the compressibility upon application of a load of 40 N ($R_{40}$), thereby finding a compressibility difference ($\Delta R$).

$$\Delta R=R_{40}-R_{10}$$

<Impact Absorptivity Test>

A shock-absorbing sheet (50 mm square) was placed on the center of the acrylic plate (100 mm square, 10 mm thick). An acceleration sensor was mounted on the surface opposite to the surface of the acrylic plate on which the shock-absorbing sheet was placed. Note that the four corners of the acrylic plate were fixed with 35 mm long bolts to a base in such a manner that the top face of the acrylic plate was placed and held at 25 mm above the base.

Under a test environment of 23° C., 13.8 g (diameter of 15 mm) of an iron ball was dropped from the height of 100 mm toward the central position of the shock-absorbing sheet, and then acceleration was measured upon collision with the shock-absorbing sheet. Further, similar dropping of the iron ball and measurement of the acceleration were repeated 6 times without exchanging the shock-absorbing sheet, the average value of accelerations found from total 7 times of dropping and measurement was designated as acceleration ($L_{1a}$). Further, similar dropping of the iron ball and measurement of the acceleration were performed without placing any shock-absorbing sheet on the acrylic plate. The average value of accelerations found from total 7 times of dropping and measurement was designated as acceleration ($L_{0a}$). From the thus obtained acceleration ($L_{1a}$) and acceleration ($L_{0a}$), the 7-time average impact absorptivity of absorptivities found from 7 times of dropping and measurement was calculated by the following equation.

$$\text{7-time average impact absorptivity }(\%)=(L_{0a}-L_{1a})/L_{0a}\times100$$

Regarding the initial impact absorptivity, (the first time), the initial impact absorptivity was calculated from the acceleration ($L_{11}$) and acceleration ($L_{0a}$) by the following equation.

$$\text{Initial impact absorptivity }(\%)=(L_{0a}-L_{11})/L_{0a}\times100$$

Components used in Examples 1 to 5 and Comparative Examples 1 to 3 are as follows.
(1) n-butyl acrylate: BA (Nippon Shokubai Co., Ltd.)
(2) Ethyl acrylate: EA (Nippon Shokubai Co., Ltd.)
(3) Acrylic acid: AA (Nippon Shokubai Co., Ltd.)
(4) 2-ethylhexyl acrylate:2EHA
(5) Styrene: St
(6) Methyl methacrylate: MMA (Mitsubishi Gas Chemical Company, Inc.)
(7) Bifunctional cross-linking agent (trade name "NK ester APG-400", Shin-Nakamura Chemical Co., Ltd.)
(8) Trifunctional cross-linking agent (trade name "NK ester A-9300-3CL", Shin-Nakamura Chemical Co., Ltd.)
(9) Photoinitiator (trade name "Irgacure184", BASF Japan Ltd.)
(10) Hollow particles A (trade name "Expancel 920DE40d30", Japan Fillite Co., Ltd.), mean particle diameter: 40 μm
(11) Hollow particles B (trade name "Expancel 920DE80d30", Japan Fillite Co., Ltd.), mean particle diameter: 80 μm Example 1

50 parts by mass of butyl acrylate, 25 parts by mass of ethyl acrylate, 25 parts by mass of acrylic acid, and 0.5 parts by mass of photoinitiator were mixed and then subjected to partial polymerization by polymerization using ultraviolet rays, thereby preparing a syrup curable acrylic resin composition having viscosity of 2000 mPa·s. To the resin composition, 2 parts by mass of a bifunctional cross-linking agent, 1 part by mass of a trifunctional cross-linking agent and 2 parts by mass of hollow particles A were added and mixed, and then a final curable acrylic resin composition was prepared. Release paper was coated with the composition at 23° C. and then irradiated with ultraviolet rays, thereby preparing a 103 μm thick shock-absorbing sheet.

Note that ultraviolet rays were irradiated under conditions where the illuminance was 4 mW/cm$^2$ and the quantity of light was 720 mJ/cm$^2$.

Example 2

A shock-absorbing sheet was prepared in a manner similar to that in Example 1 except for adjusting the viscosity of a syrup curable acrylic resin composition to be 600 mPa·s.

Example 3

A shock-absorbing sheet was prepared in a manner similar to that in Example 1 except for using hollow particles B instead of hollow particles A.

Example 4

A shock-absorbing sheet was prepared in a manner similar to that in Example 1 except for using 29 parts by mass of butyl acrylate, 57 parts by mass of ethyl acrylate, 14 parts by mass of acrylic acid, and 2 parts by mass of hollow particles B.

Example 5

As depicted in Table 1, an emulsion composition (solid content: 50 mass %) that is a water dispersion of an acrylic resin was prepared through emulsion polymerization of 25 parts by mass of n-butyl acrylate (BA), 25 parts by mass of 2-ethylhexyl acrylate (2EHA) and 50 parts by mass of styrene (St). The emulsion composition was kneaded for 1.5 minutes using a kneading machine (Tescom & Co., Ltd. "THM1200") at room temperature under conditions of the second stage speed setting for mixing air thereinto by a mechanical froth method, thereby forming cells. The viscosity of the emulsion composition in which cells were formed was 700 mPa·s. The emulsion composition in which cells were formed was applied onto release paper at 23° C. so as to shape it into a film. The film was heated at 100° C. for 5 minutes for drying, thereby obtaining a shock-absorbing sheet including a foamed resin layer. The average cell diameter in the shock-absorbing sheet was 65 μm.

Comparative Example 1

A shock-absorbing sheet was prepared in a manner similar to that in Example 1 except for adjusting the viscosity of a syrup curable acrylic resin composition to be 150 mPa·s.

Comparative Example 2

A shock-absorbing sheet was prepared in a manner similar to that in Example 1 except for using 40 parts by mass of butyl acrylate, 40 parts by mass of ethyl acrylate, 20 parts by mass of methyl methacrylate, 2 parts by mass of photoinitiator, and 2 parts by mass of hollow particles B.

Various evaluations were performed for the shock-absorbing sheets prepared in the Examples and Comparative Examples. The results are depicted in Table 1 below.

Comparative Example 3

This example was performed in a manner similar to that in Example 5 except for employing the kneading time of 1 minute. Note that the viscosity of the emulsion composition in which cells were formed was 180 mPa·s. Further, the average cell diameter in the shock-absorbing sheet was 95 μm.

TABLE 1

| Items | | | Unit | Example 1 | Example 2 | Example 3 | Example 4 | Example 5 | Comparative Example 1 | Comparative Example 2 | Comparative Example 3 |
|---|---|---|---|---|---|---|---|---|---|---|---|
| Monomer component | BA | | [phr] | 50 | 50 | 50 | 29 | 25 | 50 | 40 | 25 |
| | EA | | [phr] | 25 | 25 | 25 | 57 | | 25 | 40 | |
| | AA | | [phr] | 25 | 25 | 25 | 14 | | 25 | | |
| | MMA | | [phr] | | | | | | | 20 | |
| | 2EHA | | [phr] | | | | | 25 | | | 25 |
| | St | | [phr] | | | | | 50 | | | 50 |
| | Total | | [phr] | 100 | 100 | 100 | 100 | 100 | 100 | 100 | 100 |
| | Glass transition temperature (Tg) | | [° C.] | −19.3 | −19.3 | −19.3 | −19.6 | −5.0 | −19.3 | −19.5 | −5.0 |
| Hollow particles, Other additives | Photoinitiator | | [phr] | 0.5 | 0.5 | 0.5 | 0.5 | — | 0.5 | 2 | — |
| | Cross-linking agent | Bifunctional | [phr] | 2 | 2 | 2 | 2 | — | 2 | 2 | — |
| | | Trifunctional | [phr] | 1 | 1 | 1 | 1 | — | 1 | 1 | — |
| | Hollow particles | A | [phr] | 2 | 2 | | | — | 2 | | — |
| | | B | [phr] | | | 2 | 2 | — | | 2 | — |
| Foamed resin layer | Thickness | | [μm] | 103 | 99 | 110 | 97 | 108 | 97 | 99 | 92 |
| | Apparent density | | [g/cm³] | 0.69 | 0.67 | 0.73 | 0.75 | 0.54 | 0.65 | 0.72 | 0.78 |
| | Gel fraction (degree of crosslinking) | | [%] | 99 | 99 | 99 | 99 | 75 | 99 | 98 | 75 |
| | P0.1 (void ratio of 0.1 T plane directional cross section) | | [%] | 36 | 19 | 15 | 21 | 43 | 12 | 10 | 9 |
| | P0.5 (void ratio of 0.5 T plane directional cross section) | | [%] | 43 | 51 | 51 | 50 | 68 | 50 | 35 | 32 |
| | P0.9 (void ratio of 0.9 T plane directional cross section) | | [%] | 46 | 18 | 28 | 23 | 46 | 2.5 | 4.6 | 21 |
| | Pσ (standard deviation) | | | 4.2 | 15 | 15 | 13 | 11 | 21 | 13 | 9.4 |
| Performance | tan δ at 23° C. | | | 0.8 | 0.8 | 0.8 | 0.4 | 0.6 | 0.8 | 0.5 | 0.6 |
| | Storage elastic modulus at 23° C. | | [Pa] | $1.2 \times 10^7$ | $1.2 \times 10^7$ | $1.2 \times 10^7$ | $4.9 \times 10^6$ | $12 \times 10^6$ | $12 \times 10^7$ | $3.0 \times 10^6$ | $1.5 \times 10^6$ |
| | tanδ peak temperature | | [° C.] | 18 | 18 | 18 | 3 | 15 | 18 | 9 | 15 |
| | tanδ peak height | | | 0.9 | 0.9 | 0.9 | 1.1 | 0.8 | 0.9 | 0.8 | 0.8 |
| | Compression test for curved surface at 10° C. | Compressibility (R10) upon application of a load of 10N | [%] | 28 | 28 | 20 | 29 | 43 | 35 | 31 | 32 |
| | | Compressibility (R40) upon application of a load of 40N | [%] | 45 | 48 | 36 | 46 | 59 | 45 | 44 | 46 |
| | | Compressibility difference (ΔR) | [%] | 17 | 19 | 16 | 17 | 16 | 10 | 13 | 14 |
| | Impact absorptivity at 23° C. | Initial | [%] | 55 | 47 | 54 | 47 | 52 | 41 | 40 | 41 |
| | | 7-time average | [%] | 49 | 41 | 46 | 40 | 48 | 28 | 33 | 42 |

As is clear from the above examples, the shock-absorbing sheets according to the examples exhibited both initial impact absorptivity and the 7-time average impact absorptivity higher than those of the Comparative Examples.

The invention claimed is:

1. A shock-absorbing sheet comprising a foamed resin layer having a thickness (T) of 200 μm or less,
   a void ratio ($P_{0.1}$) of a plane directional cross section at a thickness of 0.1 T, a void ratio ($P_{0.5}$) of a plane directional cross section at a thickness of 0.5 T, and a void ratio ($P_{0.9}$) of a plane directional cross section at a thickness of 0.9 T from one surface of the foamed resin layer each ranging from 10 to 70 area %, and
   a standard deviation (Pσ) for an average void ratio found from the void ratio ($P_{0.1}$), the void ratio ($P_{0.5}$) and the void ratio ($P_{0.9}$) ranging from 1.0 to 20.

2. The shock-absorbing sheet according to claim 1, wherein the foamed resin layer is a foamed acrylic resin layer made of an acrylic resin.

3. The shock-absorbing sheet according to claim 2, wherein the acrylic resin constituting the foamed acrylic resin layer has a glass transition temperature ranging from −25° C. to 15° C.

4. The shock-absorbing sheet according to claim 1, wherein a difference between a compressibility upon application of a load of 40 N and a compressibility upon application of a load of 10 N is 15% or more in a compression test for curved surface at 10° C.

5. The shock-absorbing sheet according to claim 1, wherein impact absorptivity at 23° C. is 35% or more.

6. The shock-absorbing sheet according to claim 1, wherein the sheet is used for electronic equipment.

7. The shock-absorbing sheet according to claim 1, wherein the sheet is disposed on the back side of a display apparatus.

8. The shock-absorbing sheet according to claim 1, wherein the void ratio ($P_{0.1}$), the void ratio ($P_{0.5}$) and the void ratio ($P_{0.9}$) each ranges from 10 to 60 area %.

9. The shock-absorbing sheet according to claim 1, wherein the foamed resin layer comprises hollow particles.

10. The shock-absorbing sheet according to claim 1, wherein the foamed resin layer comprises cells of a gas mixed in the foamed resin layer.

11. A method for producing the shock-absorbing sheet according to claim 9, comprising forming a monomer composition comprising a monomer component for forming a resin and hollow particles into a film and polymerizing the monomer component.

12. A method for producing the shock-absorbing sheet according to claim 10, comprising mixing a gas into an emulsion composition comprising a resin emulsion and forming the emulsion composition into a film, and then heating the emulsion composition in which the gas is mixed.

13. The method for producing a shock-absorbing sheet according to claim 12, comprising mixing a gas into the emulsion composition by a mechanical froth method.

* * * * *

UNITED STATES PATENT AND TRADEMARK OFFICE
CERTIFICATE OF CORRECTION

| | | |
|---|---|---|
| PATENT NO. | : 11,174,331 B2 | Page 1 of 1 |
| APPLICATION NO. | : 16/650139 | |
| DATED | : November 16, 2021 | |
| INVENTOR(S) | : Yachi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 48 days.

Signed and Sealed this
Thirteenth Day of December, 2022

Katherine Kelly Vidal
*Director of the United States Patent and Trademark Office*